March 25, 1969  F. J. STEC  3,434,651
MESH REINFORCED CLOSURE FOR FULL OPENING CAN
Filed May 12, 1967

INVENTOR
FREDERICK J. STEC
BY
Mason, Porter, Diller & Brown
ATTORNEYS

United States Patent Office 3,434,651
Patented Mar. 25, 1969

3,434,651
MESH REINFORCED CLOSURE FOR FULL
OPENING CAN
Frederick J. Stec, Oak Lawn, Ill., assignor to Continental
Can Company, Inc., New York, N.Y., a corporation of
New York
Filed May 12, 1967, Ser. No. 638,136
Int. Cl. B65d 5/64, 43/00, 17/00, 5/54, 5/70, 3/10
U.S. Cl. 229—43                                    7 Claims

ABSTRACT OF THE DISCLOSURE

This disclosure has to do with a container wherein the end closure is bonded to the container body and the container is opened by the progressive rupture of the bond. The end closure is reinforced along the bond in a manner to assure separation of the end closure from the container body along the general plane of the bond.

This invention relates in general to new and useful improvements in container constructions, and more particularly to a novel easy opening container wherein the entire end closure is removed from the container body during the opening of the container.

This invention particularly relates to containers which are of a composite construction. The container body is preferably of a laminated construction including a paper core and surface layers formed of heat sealable materials. The end closure is also preferably of a laminated construction, and at least the inner surface layer thereof is also formed of a heat sealable material compatible with the heat sealable material of the container body. The end closure is shaped to define a peripheral groove or trough in which an end portion of the container body is received with the end closure being heat sealed to the inner and outer surfaces of the container body.

In accordance with this invention, it is proposed that the container be opened by the complete removal of the end closure from the container body. In order to efficiently effect the removal of the end closure and provide a relatively neat appearing surface on the end portion of the container body after the removal of the end closure, it is highly desirable that means be provided to assure the separation of the heat sealed bond between the layers of the container body and the end closure. It has been found that this may be readily accomplished by providing in the heat sealable layer of the end closure a reinforcing material. Thus, when a removable force is applied to the end closure, the heat sealable inner layer thereof remains intact and separation of the bond along the general interface of the bond between the layers of the container body and the end closure is readily effected.

In accordance with this invention, it is further proposed that the reinforcing material incorporated in the inner surface layer of the end closure be in the form of a mesh. Furthermore, it is proposed that this mesh, while embedded in the surface layer of the end closure, projects slightly therefrom. In this manner, the reinforcing mesh divides the inner surface layer of the end closure into a plurality of small areas which facilitates the progressive separation of the bond between the end closure and the container body.

A further feature of this invention is the provision on the end closure of a tab integrally formed therewith and projecting downwardly alongside the container body in a normally out of the way position, which tab is of a size to be readily grasped between one's fingers for the efficient progressive separation of the end closure from the container body.

With the above and other objects in view that will hereinafter appear, the nature of the invention will be more clearly understood by reference to the following detailed description, the appended claims and the several views illustrated in the accompanying drawings.

Figure 2:
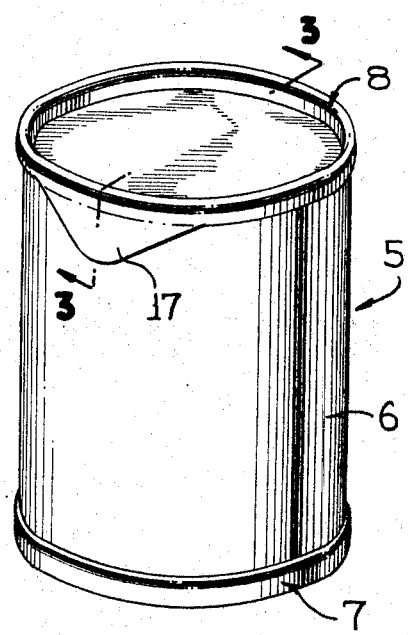
FIGURE 2 is a top perspective view of a container formed in accordance with this invention.

Referring now to the drawing in detail, it will be seen that there is illustrated in FIGURE 2 a container which is formed in accordance with this invention, the container being generally referred to by the numeral 5. The container 5 includes a container body 6 which is closed at the opposite ends thereof by means of end closures 7 at 8. As far as this invention is concerned, the end closures 7 may be of any construction, although for economy of construction, it is preferred that it be of a construction similar to the end closure 8, but not be provided with the easy opening construction thereof.

Figure 4:
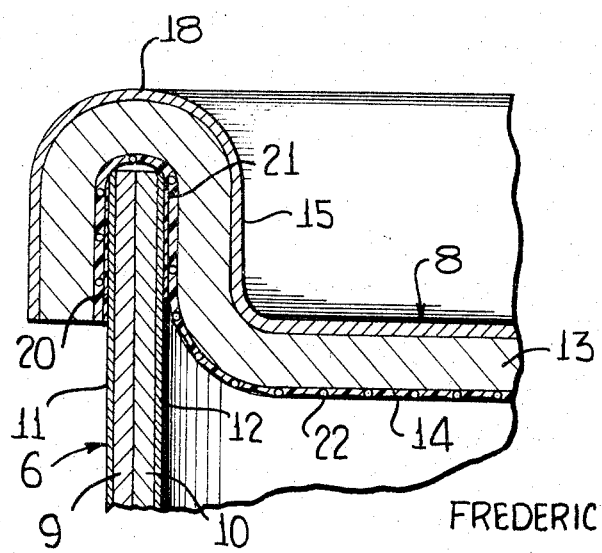
FIGURE 4 is a fragmentary vertical sectional view on a still larger scale showing more specifically the details of the connection between the end closure and the container body.

Referring now to FIGURE 4, it will be seen that the container body 6 is illustrated as being of a laminated construction. The container body 6 is illustrated as including the central core portion formed of two layers 9 and 10. These layers are preferably formed of paper secured together by means of a suitable adhesive. However, it is to be understood that the invention is not restricted to any particular core construction. The container body 6 further includes an outer layer 11 and an inner layer 12. The layers 11 and 12 are formed of a suitable heat sealable material, preferably a thermoplastic material, with polyethylene being the preferred plastic.

The end closure 8 also includes a core 13 which is preferably formed of a paper product. In accordance with this invention, the inner surface layer 14 of the end closure 8 is also formed of a heat sealable material, preferably a heat sealable plastic which is compatible with the heat sealable material of the layers 11 and 12 of the container body 6. At the present time polyethylene is also the preferred thermosplastic material for the layer 14. The end closure 8 additionally has an outer protective layer 15 which may be of any suitable material, including metal and plastic, although a metal foil is preferred.

Figure 1:
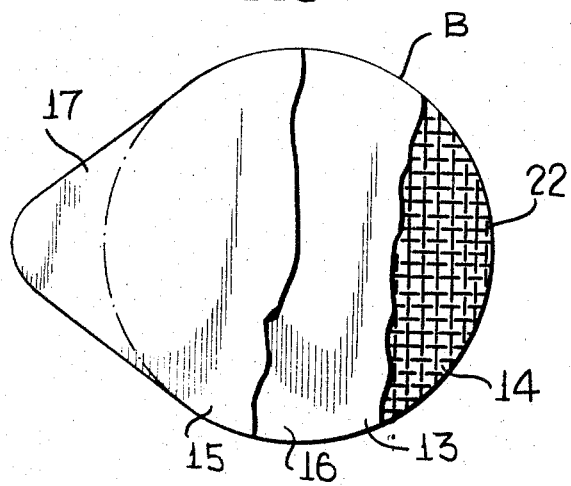
FIGURE 1 is a plan view of an end closure blank formed in accordance with this invention with portions thereof broken away and shown in section in order to illustrate the various layers thereof.

Reference is now made to FIGURE 1 wherein there is illustrated a blank B from which the end closure is formed. The blank B includes generally circular main portion 16 and a projecting, generally triangular tab 17. The several layers of the laminated construction of the blank are also clearly shown in FIGURE 1.

Figure 3:
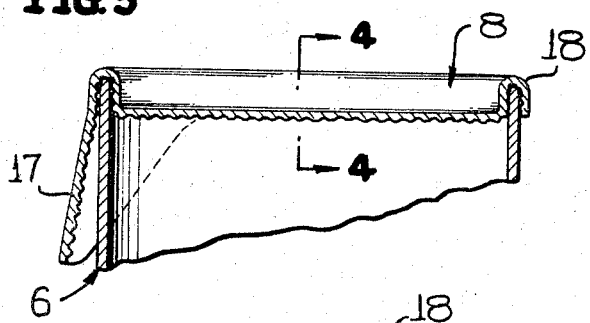
FIGURE 3 is an enlarged fragmentary vertical sectional view taken along the line 3—3 of FIGURE 2 and shows the details of the relationship between the end closure and the container body.

The blank B is then shaped to define an annular groove or socket formation which is generally identified by the numeral 18. The socket formation will be of a size to receive an end portion of the container body 6, as is clearly shown in FIGURES 3 and 4. The end closure 8, having been so formed, is telescoped over the end portion of the container body 6 with the tab 17 being disposed alongside the container body 6 in an out of the way position, as is clearly shown in FIGURES 2 and 3.

Referring now to FIGURE 4, it will be seen that the heat sealable thermoplastic layer 14 of the end closure 8 within the seat portion 18 is disposed in face-to-face relation with the surface layers 11 and 12 of the end closure 6. By applying heat to the seat portion 18 and tightly clamping the layer 14 against the layers 11 and 12, a pair of bonds 20 and 21 will be formed, the bond 20 existing between the layer 14 and the layer 11 and the bond 21 existing between the layer 12 and the layer 14.

It is pointed out here that the end closure 7 may be of the same construction as the end closure 8, as described hereinabove, with the exception of the tab 17. Thus, the end closure 7 may also be heat sealed to the container body 6 through the thermoplastic layers 11 and 12 thereof.

It is to be understood that the container 5 is to be opened by engaging the tab 17 and lifting upwardly thereon so as to progressively separate first the bond 20 and then the bond 21 until the entire bond securing the end closure 8 to the container body 6 is ruptured and the end closure 8 may be removed from the container body as a unit. After the end closure 8 has been removed, the container is fully opened and the product may be readily dispensed through the open end thereof.

The rupture of the bonds 20 and 21, unfortunately, is not as simple as that described above. There is a tendency for the thermoplastic layer 14 to tear through and then separate along the bond with the paper layer 13, including instances where the paper fibers remain adhered to the thermoplastic layer 14. While in most instances the end closure 8 may be removed from the container body 6 so as to facilitate the opening thereof, the end portion of the container body to which the end closure is bonded will have an unsightly appearance and therefore not acceptable. Accordingly, in accordance with this invention, the thermoplastic layer 14 is reinforced by means of a reinforcing material 22. The reinforcing material is preferably in the form of a mesh reinforcement and may be simply in the form of a gauze formed of such products as cotton. On the other hand, it may be formed of stronger materials, if desired.

It is to be noted that the reinforcing mesh 22 is substantially embedded within the thermoplastic layer 14, but projects slightly from the surface thereof. This relationship of the reinforcing mesh 22 with respect to the thermoplastic layer 14 provides two results. First, it reinforces the thermoplastic layer 14 so as to prevent the thermoplastic layer 14 from transversely rupturing therethrough. In addition, it divides the surface of the thermoplastic layer 14 into a plurality of relatively small areas, thereby facilitating the separation of the bonds 20 and 21 along the original surface of the thermoplastic layer 14.

It is to be understood that the reinforcing mesh 22 extends entirely across the blank B so that when one grips the tab 17, the reinforcing mesh 22 is simultaneously gripped and the tensile force applied through the tab 17 to the remainder of the end closure 8 is transmitted through the reinforcing mesh 22. It thus will be apparent that the reinforcing mesh 22 will function to provide for a clean separation of the end closure 8 from the container body 6 so that the end portion of the container body to which the end closure 8 was secured will have a neat appearance and will be suitable for the ready dispensing of the product from within the container 5.

Although polyethylene has been specifically described as being the preferred thermoplastic material for the formation of the heat sealable layers 11, 12 and 14, it is to be understood that the invention is not restricted to any specific thermoplastic material. Other thermoplastic materials which may be utilized in lieu of polyethylene are polypropylene, polyvinylchloride, etc. Also, as indicated above, the reinforcing material 22 may be formed of numerous materials. In addition to the cotton gauze, the reinforcing material 22 may be formed of a metallic or hemp mesh, and a thermosetting plastic, glass, etc. The reinforcing material can even be a thermoplastic material when the heat sealing operation is controlled and the reinforcing material does not lose its original geometry.

Although only a preferred embodiment of the invention has been specifically illustrated and described herein, it is to be understood that minor variations and modifications may be made in the construction of the end closure without departing from the spirit and consruction of the invention, as defined in the appended claims.

I claim:

1. In a container construction, an end closure, said end closure being generally circular in outline and having a projecting tab portion, said end closure being of a laminated construction and having an inner layer of a material adapted to be bonded to a container body in an operative condition of said end closure, and a reinforcing material reinforcing said inner layer of material against tearing, said reinforcing material being in the form of a mesh substantially embedded in said inner layer with said mesh being exposed and dividing the exposed surface of said inner layer into individual sectors.

2. The container construction of claim 1 wherein said inner layer is formed of a heat bondable material.

3. The container construction of claim 2 wherein said laminated construction also includes a paper intermediate layer and a metal foil outer layer.

4. In a container construction of the type comprising a container body and an end closure, said end closure having an inner surface bonded to said container, and said container being openable by the progressive rupture of said bond; the improvement residing in a reinforcing material forming part of said end closure and being incorporated in said bond to facilitate said progressive rupture of said bond.

5. The container construction of claim 4 wherein said container body and said end closure have thermoplastic layers bonded together to form said bond, and said reinforcing material is embedded in said end closure thermoplastic layer.

6. The container construction of claim 4 wherein said container body and said end closure have thermoplastic layers bonded together to form said bond, and said reinforcing material is embedded in said end closure thermoplastic layer, and is in the form of a mesh with surface portions of said mesh interrupting said bond and dividing said bond into isolated areas which are susceptible to individual progressive rupture.

7. The container construction of claim 4 wherein said end closure is shaped to define a seat receiving an end portion of said container body, said container body and said end closure each being of a laminated construction and said container body has thermoplastic inner and outer layers and said end closure has a thermoplastic innerlayer, said thermoplastic layers are bonded together to form said bond, and said reinforcing material is embedded in said end closure thermosplastic layer.

References Cited

UNITED STATES PATENTS

| | | | |
|---|---|---|---|
| 2,109,558 | 3/1938 | Waters | 229—3.5 X |
| 3,029,997 | 4/1962 | Kauffeld | 249—43 X |
| 3,121,636 | 2/1964 | Toms | 229—1.5 |
| 3,182,882 | 5/1965 | Aellen et al. | 229—4.5 |
| 2,167,634 | 8/1939 | Calvert | 229—3.5 |

FOREIGN PATENTS

| | | |
|---|---|---|
| 256,806 | 8/1926 | Great Britain. |

DAVID M. BOCKENEK, *Primary Examiner.*

U.S. Cl. X.R.

229—5.5, 51